United States Patent
Ko et al.

(10) Patent No.: US 8,830,582 B2
(45) Date of Patent: Sep. 9, 2014

(54) VIEWING GLASSES AND IMAGE BEAM ADJUSTMENT METHOD THEREOF

(75) Inventors: Chueh-Pin Ko, New Taipei (TW); Dong-Hsing Su, New Taipei (TW)

(73) Assignee: Acer Incorporated, New Taipei (TW)

(*) Notice: Subject to any disclaimer, the term of this patent is extended or adjusted under 35 U.S.C. 154(b) by 364 days.

(21) Appl. No.: 13/114,055

(22) Filed: May 24, 2011

(65) Prior Publication Data

US 2012/0069436 A1    Mar. 22, 2012

(30) Foreign Application Priority Data

Sep. 16, 2010   (TW) .............................. 99131438 A

(51) Int. Cl.

| | | |
|---|---|---|
| G02B 5/30 | (2006.01) | |
| G02B 27/28 | (2006.01) | |
| G02F 1/03 | (2006.01) | |
| G02F 1/07 | (2006.01) | |
| H04N 5/58 | (2006.01) | |
| H04N 13/04 | (2006.01) | |
| G02B 27/26 | (2006.01) | |
| H04N 21/81 | (2011.01) | |

(52) U.S. Cl.
CPC ............. *H04N 13/0438* (2013.01); *H04N 5/58* (2013.01); *H04N 13/0425* (2013.01); *H04N 21/816* (2013.01); *G02B 27/26* (2013.01); *H04N 2213/008* (2013.01); *G02B 27/286* (2013.01)
USPC ..................................... 359/490.02; 359/251

(58) Field of Classification Search
USPC ............. 359/490.01, 490.02, 490.03, 492.01, 359/493.01, 251, 303, 304, 483.01, 484.01; 356/364–369
See application file for complete search history.

(56) References Cited

U.S. PATENT DOCUMENTS

| | | | |
|---|---|---|---|
| 4,744,633 A | 5/1988 | Sheiman | |
| 5,552,841 A | 9/1996 | Gallorini et al. | |
| 6,115,177 A | 9/2000 | Vossler | |
| 6,829,056 B1 * | 12/2004 | Barnes et al. | ................. 356/625 |
| 2008/0279425 A1 | 11/2008 | Tang | |
| 2009/0162036 A1 | 6/2009 | Fujii | |
| 2010/0201790 A1 | 8/2010 | Son et al. | |
| 2011/0205495 A1 * | 8/2011 | Coleman et al. | ................... 353/8 |

FOREIGN PATENT DOCUMENTS

| | | |
|---|---|---|
| CN | 1187252 | 7/1998 |
| CN | 101676764 | 3/2010 |
| JP | 2010-217752 | 9/2010 |
| TW | 201011345 | 3/2010 |

OTHER PUBLICATIONS

"Office Action of Taiwan Counterpart Application", issued on May 22, 2013, p. 1-p. 7.

(Continued)

*Primary Examiner* — Thomas K Pham
*Assistant Examiner* — Brandi Thomas
(74) *Attorney, Agent, or Firm* — Jianq Chyun IP Office

(57) ABSTRACT

A pair of viewing glasses and an image beam adjustment method are provided, wherein the viewing glasses includes a polarizer. The adjustment method includes the following steps. Detect the transmittance of the image beam from the screen passing through the glasses. Generate an operating signal according to the operating period of the viewing glasses, a corresponding value corresponding to the operating period of the viewing glasses, and the transmittance of the image beam, so as to adjust the polarization direction of the image beam before passing through the polarizer. Maintain the operating signal during the operating period of the viewing glasses.

5 Claims, 14 Drawing Sheets

(56) References Cited

OTHER PUBLICATIONS

"First Office Action of China counterpart application" issued on Jan. 28, 2013, p. 1-p. 7.

Sakurai et al., "A Visibility Control System for Collaborative Digital Table," Personal and Ubiquitous Computing, Jul. 17, 2009, pp. 619-632, vol. 13.

"Search Report of European Counterpart Application", issued on Aug. 16, 2013, p. 1-p. 9.

* cited by examiner

VIEWING GLASSES AND IMAGE BEAM ADJUSTMENT METHOD THEREOF

CROSS-REFERENCE TO RELATED APPLICATION

This application claims the priority benefit of Taiwan application serial no. 99131438, filed Sep. 16, 2010. The entirety of the above-mentioned patent application is hereby incorporated by reference herein and made a part of this specification.

BACKGROUND OF THE INVENTION

1. Field of the Invention

The invention is related generally to an image beam adjustment method, and more particularly to an image beam adjustment method of a pair of viewing glasses.

2. Description of Related Art

As science and technology rapidly progress, in addition to striving for thinness and compactness of the display device, a major goal with regards to the area of display technology development is in the display of stereoscopic images. Generally speaking, the principle behind a stereoscopic image is sending two different images to the left and right eyes, and having the brain construct a three-dimensional (3D) image.

Currently, 3D display technologies may be generally categorized into two types, a stereoscopic type of display technologies which require a user to wear viewing glasses and an auto-stereoscopic type which does not require the viewing glasses. The viewing glasses type may be further divided into the early red and blue glasses, the shutter glasses, and the polarizing glasses nowadays. Irrespective of the type of viewing glasses, the main principle behind rendering a 3D image is having the left and right eye view different images, so that the brain views the images as a 3D image. Current 3D shutter glasses typically complement display devices such as a 3D liquid crystal television and a 3D projector to render a 3D effect.

A conventional pair of shutter glasses includes a front polarizer, a liquid crystal layer, and a back polarizer. A polarization axis direction of the front polarizer is parallel to a polarization direction of an image beam emitted from the 3D display device, and the polarization axes of the front and back polarizers are orthogonal. The liquid crystal layer is interposed between the front and back polarizers. Moreover, the liquid crystal layer is controlled by an operating voltage to alter the polarization direction of the image beam, such that after the image beam passes through the liquid crystal layer, the polarization direction of the image beam can be oriented as parallel or perpendicular to the back polarizer, so that the polarizer can block the image beam or allow the image beam to pass. By applying voltages to the left and right lenses of the shutter glasses in sequence, the shutter glasses can block the left and right images transmitted from the 3D display device at different times. Accordingly, a left eye of a viewer sees a left eye image, a right eye of the viewer sees a right eye image, and the brain of the viewer stacks the images to form a 3D image.

Although the conventional shutter glasses may achieve the effect of 3D imaging by complementing the 3D display device, there is no unified standard for the polarization direction of the image beam transmitted by the currently available 3D display devices on the market. In other words, different display devices may have image beams of different polarization directions. Therefore, a pair of shutter glasses having a particular polarization direction can only be used to complement a display device having the corresponding polarization direction. Consequently, not only is a manufacturer faced with increases in the production cost and the price for a pair of viewing glasses, the user is faced with unnecessary wastes due to the need to purchase different types of viewing glasses.

SUMMARY OF THE INVENTION

Accordingly, the invention provides a pair of viewing glasses and an image beam adjustment method thereof, capable of automatically adjusting the polarization direction of the image beam so the viewing glasses becomes suitable for use in 3D display devices having different polarization directions.

The invention provides an image beam adjustment method of a pair of viewing glasses, in which the viewing glasses includes a polarizer, and the image beam adjustment method includes first detecting a brightness or a transmittance of an image beam from a display screen after passing through the viewing glasses. Thereafter, an operating signal is generated according to an operating period of the viewing glasses, a corresponding value corresponding to the operating period of the viewing glasses, and the brightness or the transmittance of the image beam, so as to adjust a polarization direction of the image beam before passing through the polarizer so the transmittance is equal to the corresponding value corresponding to the operating period of the viewing glasses. Moreover, the operating period of the viewing glasses is a non-viewing period or a viewing period. Finally, the operating signal is maintained during the operating period of the viewing glasses.

According to an embodiment of the invention, the step of adjusting the polarization direction of the image beam includes rotating the polarization direction of the image beam towards a first direction. Next, the transmittance of the image beam is detected. Thereafter, whether the transmittance of the image beam has passed the corresponding value is determined. When the transmittance of the image beam has passed the corresponding value, the polarization direction of the image beam is rotated towards a second direction to a polarization direction corresponding to the corresponding value.

According to an embodiment of the invention, the step of adjusting the polarization direction of the image beam includes rotating the polarization direction of the image beam towards a first direction. Next, the transmittance of the image beam is detected. Thereafter, whether the transmittance of the image beam has passed the corresponding value of the viewing period or the non-viewing period is determined. When the transmittance of the image beam has passed the corresponding value of the viewing period or the non-viewing period, the polarization direction of the image beam is rotated towards a second direction to a polarization direction corresponding to the corresponding value of the viewing period or the non-viewing period. Moreover, when the corresponding value of the viewing period or the non-viewing period is not the corresponding value corresponding to the operating period of the viewing glasses, the polarization direction of the image beam is rotated by a specific angle.

According to an embodiment of the invention, the viewing glasses stores a plurality of preset voltages corresponding to a plurality of preset polarization directions, and the step of adjusting the polarization direction of the image beam includes first determining whether the transmittance of the image beam equals the corresponding value. When the transmittance of the image beam is not equal to the corresponding value, the operating signal is sequentially adjusted to one of the preset voltages so as to rotate the polarization direction of the image beam to the corresponding preset polarization direction. Moreover, whether the transmittance of the image beam corresponding to each of the preset polarization directions equals the corresponding value is determined, so as to set the preset voltage corresponding to the corresponding value as the operating signal.

According to an embodiment of the invention, the viewing glasses stores a plurality of preset voltages corresponding to a plurality of preset polarization directions, and the step of adjusting the polarization direction of the image beam further includes adjusting the operating signal to one of the preset voltages, so as to rotate the polarization direction of the image beam to the corresponding preset polarization direction. The brightness of the image beam is detected. Moreover, the operating signal is adjusted so as to rotate the polarization direction of the image beam by a specific angle. The brightness of the image beam is detected. A brightness ratio of the brightness of the image beam before and after rotating the polarization direction of the image beam by the specific angle is calculated. When the viewing glasses are operating in the non-viewing period and the brightness ratio is equal to a first preset value, or when the viewing glasses are operating in the viewing period and the brightness ratio is equal to a second preset value, the operating signal is set as the currently used preset voltage. Otherwise, the operating signal is adjusted as the next one of the preset voltages and the process returns to the first step of detecting the brightness of the image beam. The first preset value is the brightness ratio of the ideal brightness of the image beam in the non-viewing period to the ideal brightness of the image beam in the viewing period. The second preset value is the brightness ratio of the ideal brightness of the image beam in the viewing period to the ideal brightness of the image beam in the non-viewing period.

According to an embodiment of the invention, the viewing glasses stores a plurality of preset voltages corresponding to a plurality of preset polarization directions, and the step of adjusting the polarization direction of the image beam further includes adjusting the operating signal to one of the preset voltages, so as to rotate the polarization direction of the image beam to the corresponding preset polarization direction. The brightness of the image beam is detected. The operating signal is adjusted so as to rotate the polarization direction of the image beam by a specific angle. The brightness of the image beam is detected. A brightness ratio of the brightness of the image beam before and after rotating the polarization direction of the image beam by the specific angle is calculated. Whether the brightness ratio corresponding to each of the preset voltages has been calculated is determined, and when the calculation process is not yet complete, the operating signal is adjusted to the next one of the preset voltages, and the process returns to the first step of detecting the brightness of the image beam. The brightness ratio corresponding to each of the preset voltages is compared. When the viewing glasses are operating in the non-viewing period, the operating signal is set as the preset voltage corresponding to the smallest of the brightness ratios of the image beam. When the viewing glasses are operating in the viewing period, the operating signal is set as the preset voltage corresponding to the largest of the brightness ratios of the image beam.

The invention also provides a pair of viewing glasses, including a polarizer, a polarization conversion unit, a first light sensing unit, and a control unit. The polarization conversion unit is disposed between a display screen and the polarizer, and the polarization conversion unit is controlled by an operating signal to adjust a polarization direction of an image beam from the display screen before passing through the polarizer. The light sensing unit detects a first light intensity of the image beam after passing through the polarization conversion unit and the polarizer. The control unit is coupled to the first light sensing unit and the polarization conversion unit. Moreover, the control unit obtains the brightness or the transmittance of the image beam according to the first light intensity, and generates an operating signal according to an operating period of the viewing glasses, a corresponding value corresponding to the operating period of the viewing glasses, and the brightness or the transmittance of the image beam, so the transmittance is equal to the corresponding value corresponding to the operating period of the viewing glasses. In addition, the control unit maintains the operating signal during the operating period of the viewing glasses, in which the operating period of the viewing glasses is a non-viewing period or a viewing period.

In summary, according to an embodiment of the invention, by adjusting the polarization direction of the image beam according to the transmittance detected from the image beam and the corresponding value corresponding to the viewing or non-viewing period of the viewing glasses, the viewing glasses can automatically switch to a viewing mode suitable for 3D display devices with different polarization directions. Accordingly, the manufacturer saves a production cost and the user no longer has to make wasteful purchases of multiple viewing glasses.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
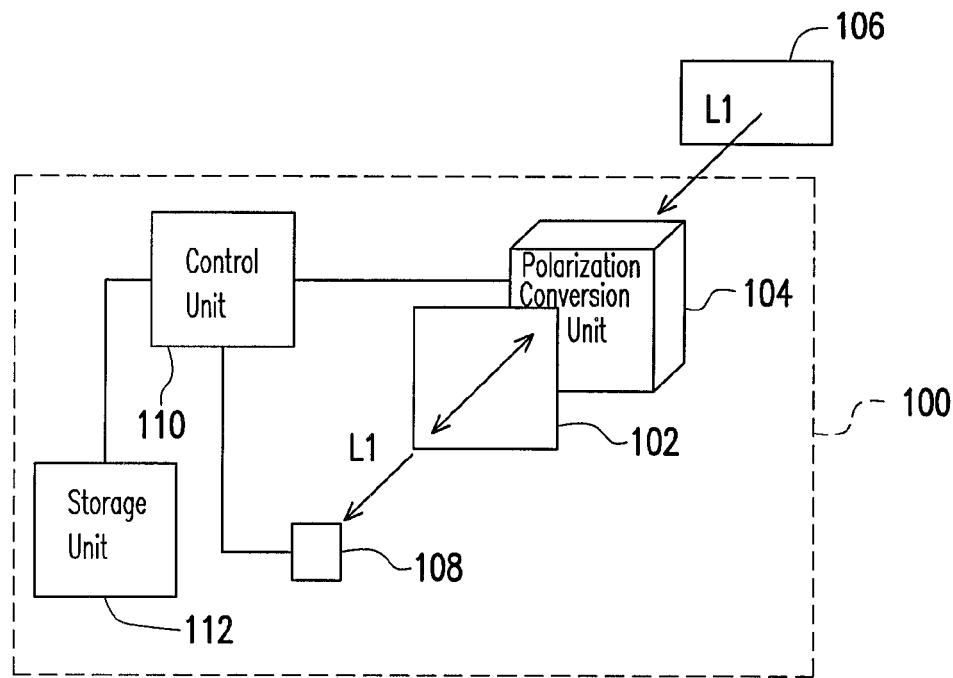
FIG. 1 is a schematic diagram of a pair of viewing glasses of a three-dimensional (3D) display device according to an embodiment of the invention.

FIG. 1 is a schematic view of a pair of viewing glasses of a three-dimensional (3D) display device according to an embodiment of the invention. Referring to FIG. 1, a pair of viewing glasses 100 is used to view an image displayed on a display screen 106 by a 3D display device. The 3D display device is, for example, a stereoscopic display device such as a linearly polarized 3D liquid crystal display, a 3D projector, or any display device or projector capable of emitting linearly polarized light. When the 3D display device is a 3D liquid crystal display, the display screen 106 refers to an image region displayed by a liquid crystal display panel of the 3D liquid crystal display. On the other hand, when the 3D display device is a 3D projector, the display screen 106 refers to a region of a display image on a plane projected by the 3D projector.

The viewing glasses 100 includes two lenses corresponding to the left and right eye, a control unit 110, and a storage unit 112. Each of the lenses includes a polarizer 102, a polarization conversion unit 104, and a light sensing unit 108. The polarization conversion unit 104 is disposed between the polarizer 102 and the display screen 106, and the polarization conversion unit 104 may be implemented by a liquid crystal layer. The control unit 110 is coupled to the polarization conversion unit 104, the light sensing unit 108, and the storage unit 112.

Figure 2:
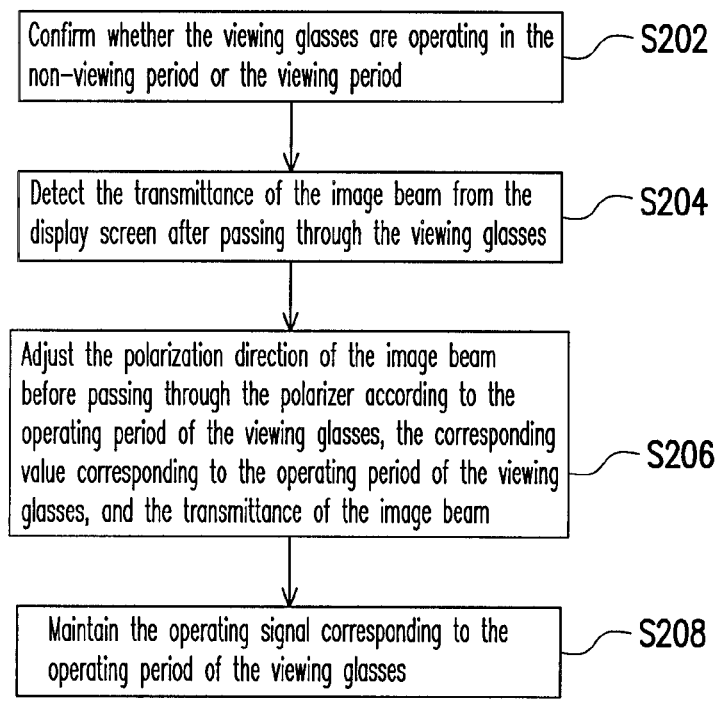
FIG. 2 is a flow chart illustrating the steps of an image beam adjustment method of a pair of viewing glasses according to an embodiment of the invention.

FIG. 2 is a flow chart illustrating the steps of an image beam adjustment method of a pair of viewing glasses according to an embodiment of the invention, the image beam adjustment method being executed by the control unit 110. The image beam adjustment method of the viewing glasses 100 is illustrated below with reference to FIGS. 1 and 2. First, the control unit 110 in the viewing glasses 100 confirms whether the viewing glasses 100 is operating in a non-viewing period or a viewing period (Step S202). For each lens in the viewing glasses 100, the non-viewing period and the viewing period respectively refers to the period which the lens blocks the passage of an image beam L1 and the period which the lens allows the image beam L1 to pass. In other words, when the lens is operating in the non-viewing period, the lens is in a closed state which completely blocks the image beam L1, or when the lens is operating in a state which is not completely open (e.g., the liquid crystals in the liquid crystal layer have not rotated to their oriented positions), the image beam L1 cannot fully passes through. Moreover, when the lens is operating in the viewing period, the lens has been completely open and in a stabilized state (e.g., the liquid crystals in the liquid crystal layer have rotated to their oriented positions), the image beam L1 can fully pass through, and this period is a preferred period for user viewing.

For example, when displaying a 3D image on the display screen 106, left and right eye images are sequentially displayed, and the viewing glasses 100 must receive the left and right eye images in a sequence corresponding to the order the left and right eye images are displayed on the display screen 106. For the left eye lens, the non-viewing period refers to the period the display screen 106 displays the right eye image, and the viewing period refers to the period the display screen 106 displays the left eye image. Similarly, for the right eye lens, the non-viewing period refers to the period the display screen 106 displays the left eye image, and the viewing period refers to the period the display screen 106 displays the right eye image.

After confirming the operating period of the viewing glasses 100, a transmittance of the image beam L1 after passing through the viewing glasses 100 is detected (Step S204). The light sensing unit 108 detects a first light intensity of the image beam L1 after passing through the polarization conversion unit 104 and the polarizer 102. According to the first light intensity detected by the light sensing unit 108 and a corresponding relationship between various levels of the first light intensity and various transmittances stored in the storage unit 112, the control unit 110 obtains the transmittance of the image beam L1 after passing through the viewing glasses 100.

Thereafter, the control unit 110 generates an operating signal according to the operating period of the viewing glasses, a corresponding value corresponding to the operating period of the viewing glasses 100, and the transmittance of the image beam L1, so as to adjust a polarization direction of the image beam before passing through the polarizer 102 (Step S206). Moreover, the polarization direction of the image beam L1 is converted to being parallel or orthogonal to a polarization axis direction of the polarizer 102, such that the image beam L1 can pass through the polarizer 102 or is blocked from passing through the polarizer 102. Accordingly, the transmittance of the image beam L1 is respectively equal to the corresponding value corresponding to the viewing period or the non-viewing period. The operating signal is, for example, an operating voltage. When the operating voltage is applied on the polarization conversion unit 104, the polarization direction of the image beam L1 after passing through the polarization conversion unit 104 can be adjusted. In addition, the corresponding values of the viewing glasses 100 corresponding to the non-viewing period and the viewing period may be respectively a lowest transmittance (0%) or a highest transmittance (100%) of the image beam L1, or transmittances of other numerical values such as 90%, 80%, 50%, 10%, and so on. The corresponding values of the viewing glasses 100 corresponding to the non-viewing period and the viewing period may be set according to the user's preference for the brightness of the display image.

Thereafter, the control unit 110 maintains the operating signal corresponding to the operating period of the viewing glasses 100 (Step S208), such that the transmittance of the image beam L1 is maintained at the corresponding value corresponding to the operating period. For example, during the non-viewing period, the transmittance of the image beam L1 is maintained at the lowest transmittance (e.g., to prevent the image beam L1 from passing through the polarizer 102). Moreover, during the viewing period, the transmittance of the image beam L1 is maintained at the highest transmittance (e.g., so the image beam L1 can pass through the polarizer 102). By using such a sequence of left and right eye images to determine whether the image beam L1 passes through or not, the left or the right eye image of the viewer is shielded sequentially, and thus achieving a stereoscopic image effect for the viewer to experience.

It should be noted that, the polarization conversion unit 104 may be implemented by a liquid crystal layer, and a rotational angle of the liquid crystals in the liquid crystal layer may be altered according to the applied operating voltage, so as to convert the polarization direction of the image beam L1 to being parallel or orthogonal to the polarization axis direction of the polarizer 102. In other embodiments of the invention, the polarization conversion unit 104 depicted in the embodiment of FIG. 1 may also be implemented by using two liquid crystal layers. One of the liquid crystal layers is closer to the display screen 106, while the other is farther away from the display screen 106. The liquid crystal layer closer to the display screen 106 first converts the angle of the polarization direction of the image beam L1 to being orthogonal to the polarization axis direction of the polarizer 102. Thereafter, according to the sequence of changing viewing and non-viewing periods, the liquid crystal layer farther away from the display screen 106 controls whether the image beam L1 can pass through the polarizer 102. In other words, converting the polarization direction of the image beam L1 while operating in the viewing period allows passage of the image beam L1 through the polarizer 102. On the other hand, converting the polarization direction of the image beam L1 while operating in the non-viewing period blocks the passage of the image beam L1 from the polarizer 102.

By adjusting the polarization direction of the image beam L1 according to the transmittance detected from the image beam L1 and the corresponding value corresponding to the viewing or non-viewing period of the viewing glasses 100, the viewing glasses 100 can automatically switch to a viewing mode suitable for 3D display devices with different polarization directions. Accordingly, the manufacturer saves a production cost and the user no longer has to make wasteful purchases of multiple viewing glasses. The adjustment method also performs automatic corrections when a viewing angle or a viewing direction of the viewer is inclined, so the image seen by the viewer does not darken.

Figure 3:
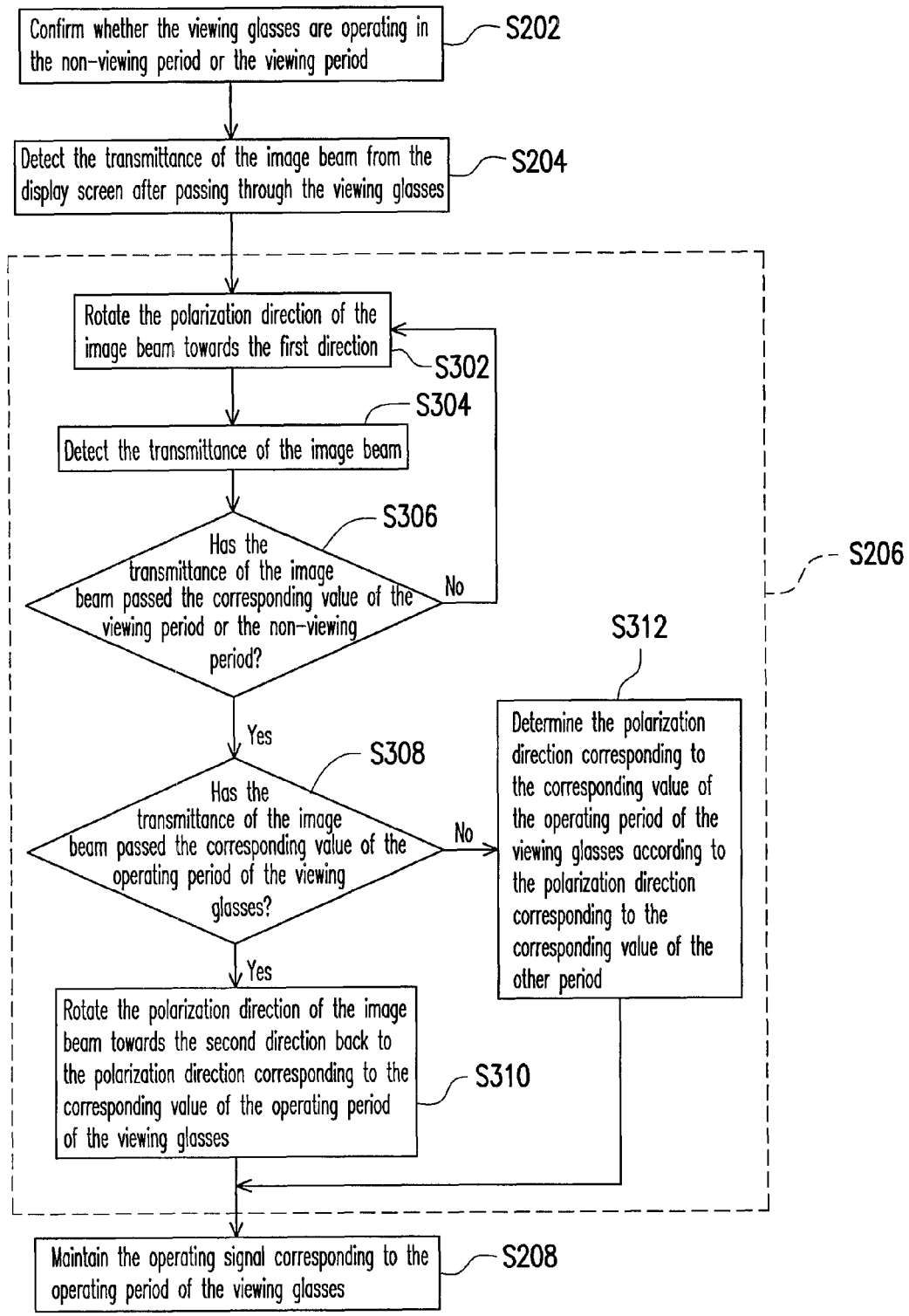
FIG. 3 is a flow chart illustrating the steps of an image beam adjustment method of a pair of viewing glasses according to another embodiment of the invention.

Specifically, a plurality of methods may be used to implement the steps (e.g., Step S206) executed by the control unit 110 to adjust the polarization direction of the image beam L1 before passing through the polarizer 102 according to the operating period of the viewing glasses 100, the corresponding value corresponding to the operating period of the viewing glasses 100, and the transmittance of the image beam L1 (i.e., Step S206). Several embodiments are illustrated hereinafter to further describe the implementation methods of adjusting the polarization direction of the image beam L1 before passing through the polarizer 102. FIG. 3 is a flow chart illustrating the steps of an image beam adjustment method of a pair of viewing glasses according to another embodiment of the invention. Referring to FIG. 3, a difference between the present embodiment and the embodiment depicted in FIG. 2 is that, in the present embodiment, the Step S206 of adjusting the polarization direction of the image beam L1 may be divided into the following steps. First, in a Step S302, after the polarization conversion unit 104 rotates the polarization direction of the image beam L1 an angle towards a first direction (e.g., rotating along a clockwise or a counter-clockwise direction), the control unit 110 calculates the transmittance of the image beam L1 after passing through the viewing glasses 100 according to the first light intensity detected by the light sensing unit 108 (Step S304). Moreover, a rotational angular value of polarization direction of the image beam L1 may be set as a fixed angle (e.g., 45 degrees) per rotation, or set so that each rotational angular value corresponds to a fixed transmittance variation.

Thereafter, the control unit 110 determines whether the transmittance of the image beam L1 has passed the corresponding value of the viewing period or the non-viewing period (Step S306). When the transmittance of the image beam L1 has not passed the corresponding value of the viewing period or the non-viewing period, then the process returns to the Step S302, which continues to rotate the polarization direction of the image beam L1 towards the first direction. When the transmittance of the image beam L1 has passed the corresponding value of the viewing period or the non-viewing period, then the control unit 110 determines whether the transmittance of the image beam L1 has passed the corresponding value of the operating period of the viewing glasses 100 (Step S308). When the transmittance of the image beam L1 has passed the corresponding value of the operating period of the viewing glasses 100, the control unit 110 controls the polarization conversion unit 104 to rotate the polarization direction of the image beam L1 towards a second direction back to a polarization direction corresponding to the corresponding value of the operating period of the viewing glasses 100 (Step 310). On the other hand, when the transmittance of the image beam L1 has passed the corresponding value of the one of the viewing period and the non-viewing period other than the operating period of the viewing glasses 100, the polarization direction corresponding to the corresponding value of the operating period of the viewing glasses is determined in accordance to the polarization direction corresponding to the corresponding value of the other period, so as to set the polarization direction corresponding to the corresponding value of the operating period of the viewing glasses 100 as the polarization direction of the image beam L1 (Step S312). Accordingly, the transmittance of the image beam L1 matches the corresponding value corresponding to the operating period of the viewing glasses 100. Finally, the operating signal corresponding to the corresponding value is maintained during the operating period of the viewing glasses 100 (Step S208).

For example, when the operating period of the viewing glasses 100 is the viewing period, and when the control unit 110 determines that the transmittance of the image beam L1 has not reached the corresponding value of the viewing period, the control unit 110 controls the polarization control unit 104 to continue rotating the polarization direction of the image beam L1 towards a first direction, until the control unit 110 determines the transmittance of the image beam L1 has passed the corresponding value of the viewing period or the non-viewing period. When the transmittance of the image beam L1 has passed the corresponding value of the viewing period, the polarization conversion unit 104 rotates the polarization direction of the image beam L1 towards the second direction opposite to the first direction, and rotates the polarization direction of the image beam L1 to the direction corresponding to the corresponding value of the viewing period. On the other hand, when the corresponding value that the transmittance of the image beam L1 surpasses is the corresponding value of the non-viewing period, after the polarization conversion unit 104 rotates the polarization direction of the image beam L1 to the direction corresponding to the corresponding value of the non-viewing period, the polarization direction of the image beam L1 is further rotated a specific angle, such that the polarization direction of the image beam L1 is set as the polarization direction corresponding to the corresponding value of the viewing period. The aforementioned specific angle is defined as, a difference angle between the polarization directions of the image beam L1 fully passing through the polarization conversion unit 104, and the image beam L1 completely blocked by the polarization conversion unit 104. In the present embodiment, the specific angle is 90 degrees.

For example, when the polarization conversion unit 104 rotates the polarization direction of the image beam L1, assume each rotation changes the transmittance of the image beam L1 by 9%. When the transmittance variation of the image beam L1 is 12%, 3%, and 6% sequentially, since the transmittance has changed from high to low, then from low to high, the transmittance of the image beam L1 has passed the corresponding value. Thereafter, the polarization conversion unit 104 rotates the polarization direction of the image beam L1 by a smaller unit angle, so as to fine tune the transmittance of the image beam L1 to the corresponding value. For example, by changing the transmittance 1% for each rotation of the polarization direction of the image beam L1, the transmittance of the image beam L1 can be adjusted to 0%. At this time, when the operating period of the viewing glasses 100 is the viewing period, then the polarization direction of the image beam L1 is maintained. On the other hand, when the operating period of the viewing glasses 100 is the non-viewing period, then the polarization direction of the image beam L1 is rotated by 90 degrees.

Figure 4:
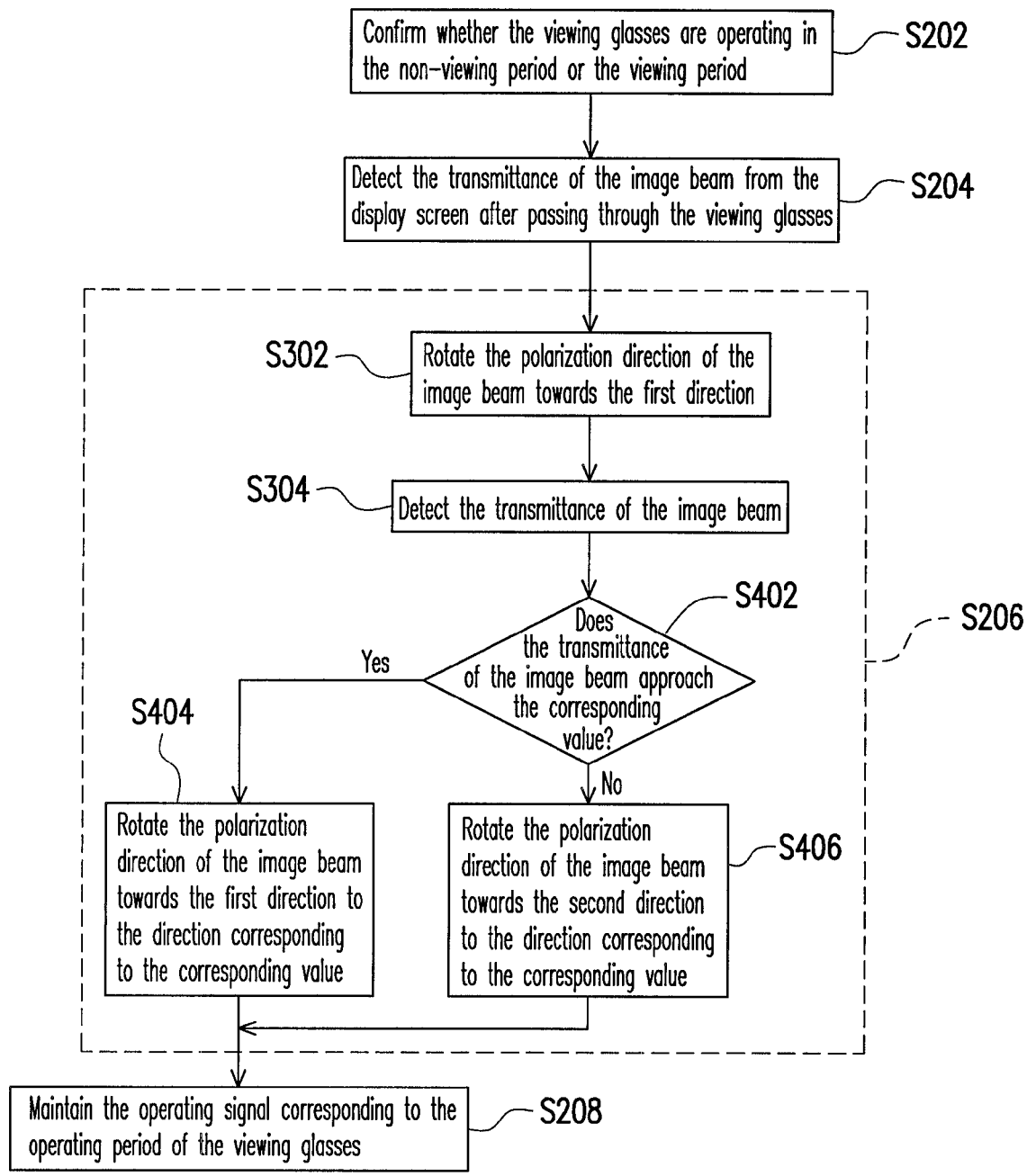
FIG. 4 is a flow chart illustrating the steps of an image beam adjustment method of a pair of viewing glasses according to another embodiment of the invention.

FIG. 4 is a flow chart illustrating the steps of an image beam adjustment method of a pair of viewing glasses according to another embodiment of the invention. Referring to FIG. 4, a difference between the present embodiment and the embodiment depicted in FIG. 3 is that, in the present embodiment after the Step S304, the control unit 110 determines whether the transmittance of the image beam L1 is approaching the corresponding value corresponding to the operating period of the viewing glasses 100 stored in the storage unit 112 (Step S402). The conditions for approaching the corresponding value may be the brightness continually increasing to approach the corresponding value, or the brightness continually decreasing to approach the corresponding value. When a difference between the current transmittance and the corresponding value is less than the previous detected difference between the transmittance and the corresponding value, then the transmittance is approaching the corresponding value. On the other hand, when the difference between the current transmittance and the corresponding value is greater than the previous detected difference between the transmittance and the corresponding value, then the transmittance is deviating from the corresponding value.

When the transmittance of the image beam L1 approaches the corresponding value, the control unit 110 controls the polarization control unit 104 to continue rotating the polarization direction of the image beam L1 towards the first direction to the direction corresponding to the corresponding value (Step S404). Conversely, when the transmittance of the image beam L1 deviates from the corresponding value, the control unit 110 controls the polarization control unit 104 to rotate the polarization direction of the image beam L1 towards the second direction (Step S406), and rotate the polarization direction of the image beam L1 in the second direction to the direction corresponding to the corresponding value (Step S404).

Figure 5:
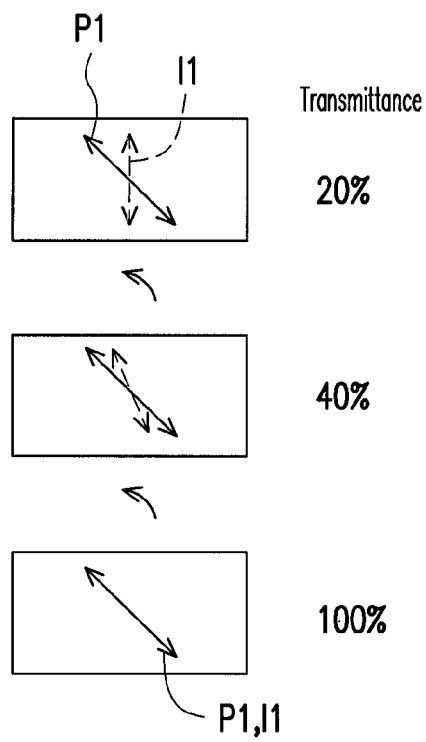
FIG. 5 is schematic view of an image beam adjustment of a pair of viewing glasses according to an embodiment of the invention.

For example, FIG. 5 is schematic view of an image beam adjustment of a pair of viewing glasses according to an embodiment of the invention, and in the present embodiment, the polarization conversion unit 104 adjusting the polarization direction of the image beam L1 is implemented by a single liquid crystal layer. A solid line arrow P1 represents the polarization axis direction of the polarizer 102, whereas a dotted line arrow I1 represents the polarization direction of the image beam L1. Referring to FIG. 5, assuming the operating period of the viewing glasses 100 is the viewing period, when the control unit 110 determines the transmittance of the image beam L1 increases as the rotational angle in a counter-clock wise direction (e.g., the first direction) becomes greater (e.g., when the transmittance of the image beam L1 approaches the corresponding value, where the transmittance increases from 20% to 40%), then the polarization direction of the image beam L1 is continually rotated in the counter-clock wise direction to the direction corresponding to the highest transmittance (e.g., 100% transmittance). In other words, the polarization direction of the image beam L1 is continually rotated until the transmittance of the image beam L1 is equal to the highest transmittance. Conversely, when the control unit 110 determines the transmittance of the image beam L1 decreases as the rotational angle in a counter-clock wise direction becomes smaller, then the transmittance of the image beam L1 is deviating from the highest transmittance. At this time, the rotational direction of the polarization direction of the image beam L1 may be changed to the clockwise direction, and the polarization direction of the image beam L1 is rotated to the direction corresponding to the highest transmittance.

Figure 6:
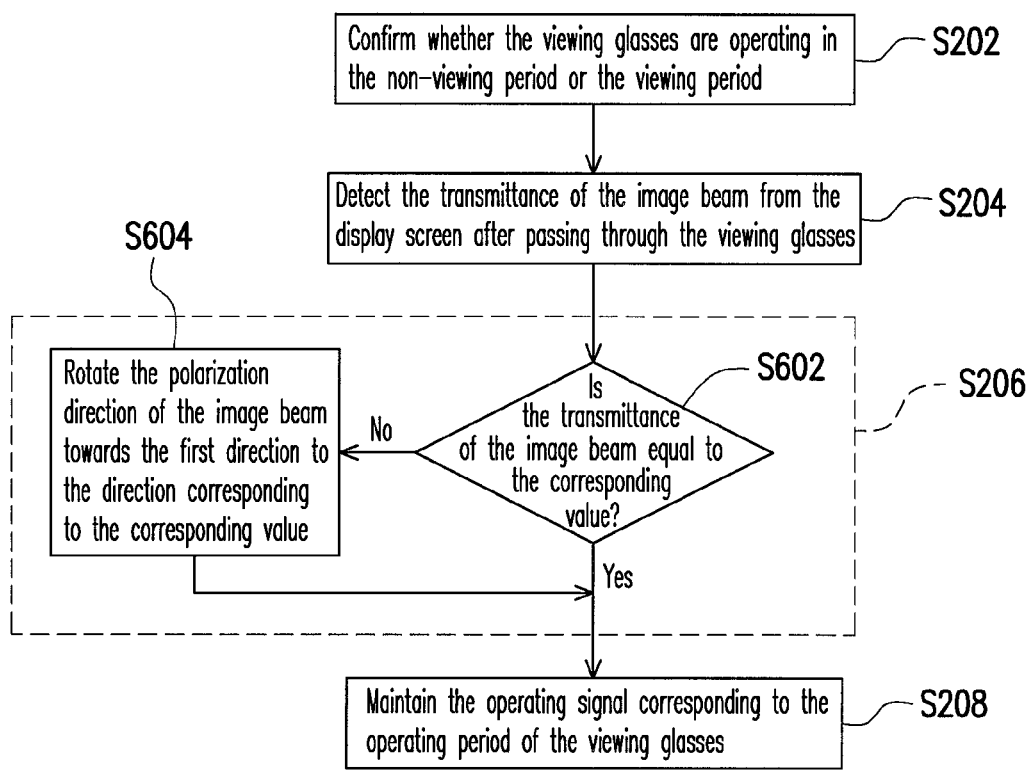
FIG. 6 is a flow chart illustrating the steps of an image beam adjustment method of a pair of viewing glasses according to another embodiment of the invention.

FIG. 6 is a flow chart illustrating the steps of an image beam adjustment method of a pair of viewing glasses according to another embodiment of the invention. Referring to FIG. 6, a difference between the present embodiment and the embodiment depicted in FIG. 2 is that, in the present embodiment, the Step S206 adjusting the polarization direction of the image beam L1 includes the control unit first determining whether the transmittance of the image beam L1 is equal to the corresponding value corresponding to the operating period of the viewing glasses 100 stored in the storage unit 112 (Step S602). When the transmittance of the image beam L1 is already equal to the corresponding value corresponding to the operating period of the viewing glasses 100, the operating signal corresponding to the corresponding value is maintained during the operating period of the viewing glasses 100 (e.g., Step S208). When the transmittance of the image beam L1 is not equal to the corresponding value of the operating period of the viewing glasses 100, the control unit 110 controls the polarization conversion unit 104 to rotate the polarization direction of the image beam L1 towards the first direction or the second direction, so as to continually adjust the polarization direction of the image beam L1 to the direction corresponding to the corresponding value (S604). Thereafter, the operating signal corresponding to the corresponding value is maintained during the operating period of the viewing glasses 100 (Step S208).

Figure 7:
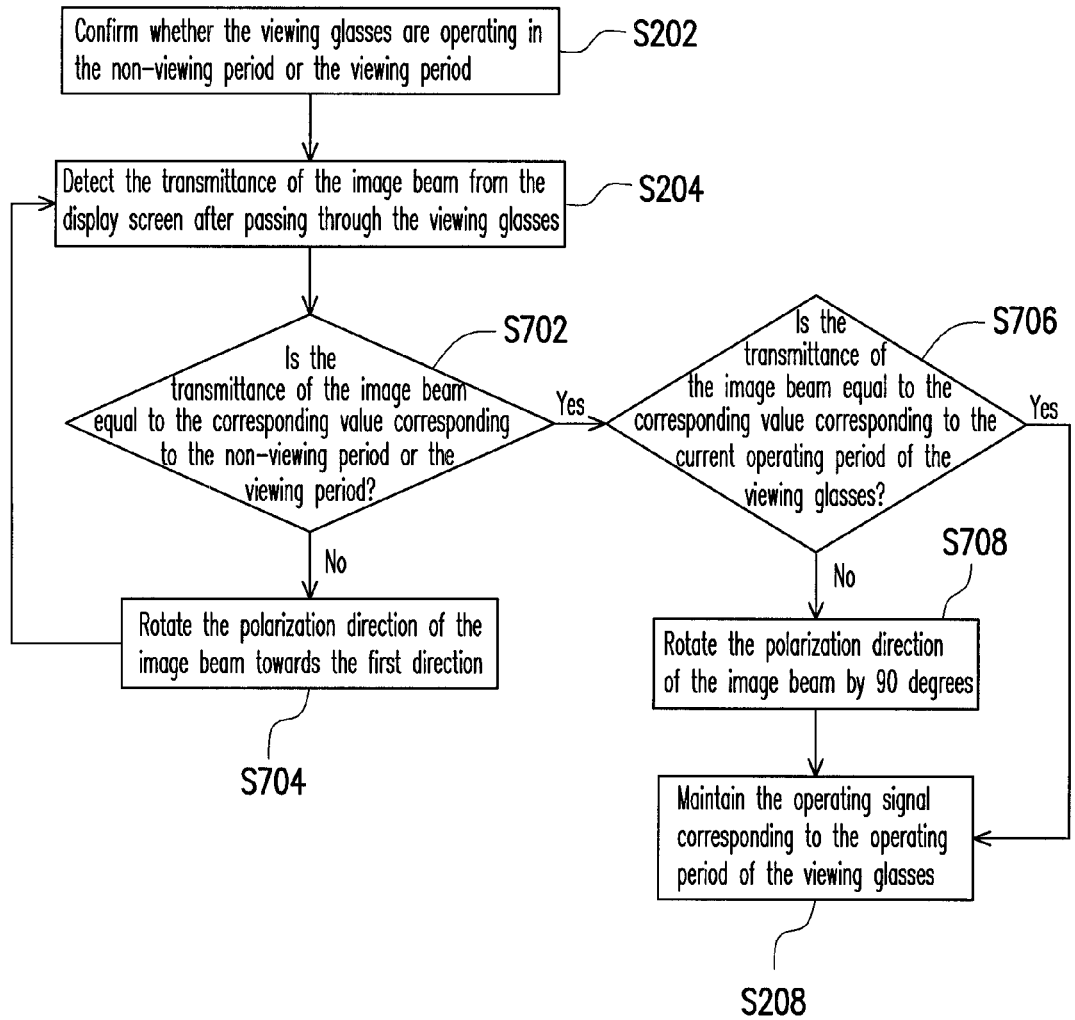
FIG. 7 is a flow chart illustrating the steps of an image beam adjustment method of a pair of viewing glasses according to another embodiment of the invention.

FIG. 7 is a flow chart illustrating the steps of an image beam adjustment method of a pair of viewing glasses according to another embodiment of the invention. Moreover, in FIG. 8, the solid line arrow P1 represents the polarization axis direction of the polarizer 102, whereas the dotted line arrow I1 represents the polarization direction of the image beam L1. Referring to FIG. 7, a difference between the present embodiment and the embodiment depicted in FIG. 2 is that, in the present embodiment, after detecting the transmittance of the image beam L1 from the display screen 106 after passing through the viewing glasses 100 (Step S204), the control unit 110 first determines whether the transmittance of the image beam L1 is equal to the corresponding value corresponding to the non-viewing period of the viewing period (Step S702). When the transmittance of the image beam L1 is not equal to the aforementioned corresponding value, then the polarization direction of the image beam L1 is rotated towards a first direction (Step S704), and thereafter the process returns to the Step S204 to detect the transmittance of the image beam L1. Conversely, when the transmittance of the image beam L1 is equal to the corresponding value of the non-viewing period or the viewing period, then the control unit 110 determines whether the transmittance of the image beam L1 is equal to the corresponding value corresponding to the current operating period of the viewing glasses 100 (Step S706). If affirmative, then the control unit 110 maintains the current operating signal during the current period (Step S208). If not affirmative, this means the transmittance of the image beam L1 is equal to the corresponding value corresponding to the one of the viewing period and the non-viewing period other than the operating period of the viewing glasses 100. Accordingly, the control unit 110 controls the polarization conversion unit 104 to directly rotates the polarization direction of the image beam L1 a specific angle (e.g., 90 degrees in the present embodiment, although not limited thereto) (Step S708), so as to adjust the polarization direction of the image beam L1 to a correct direction corresponding to the operating period of the viewing glasses 100. Thereafter, the operating signal corresponding to the corresponding value is maintained during the operating period of the viewing glasses 100 (Step S208).

Figure 8:
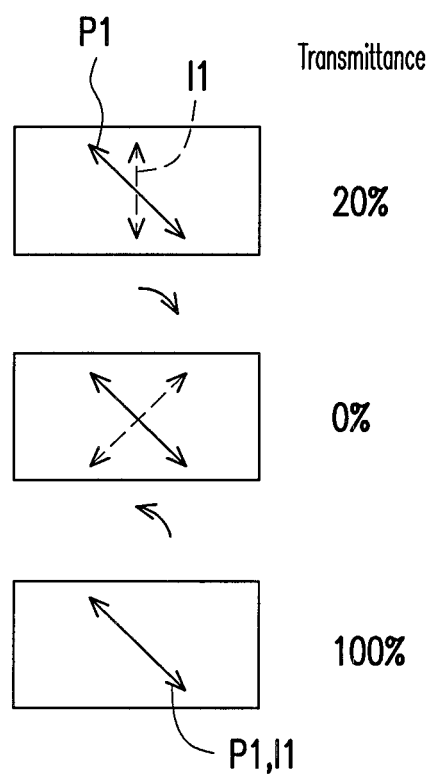
FIG. 8 is schematic view of an image beam adjustment of a pair of viewing glasses according to another embodiment of the invention.

For example, FIG. 8 is schematic view of an image beam adjustment of a pair of viewing glasses according to another embodiment of the invention. Referring to FIG. 8, assuming the operating period of the viewing glasses 100 is the viewing period, when the transmittance of the image beam L1 decreases from 20% to 0% due to a clockwise rotation (e.g., the first direction), the control unit 110 determines the transmittance of the image beam L1 is equal to the corresponding value, and this corresponding value is not the corresponding value corresponding to the operating period (viewing period) of the viewing glasses 100. Therefore, the control unit 110 controls the polarization conversion unit 104 to directly rotate the polarization direction of the image beam L1 a specific angle (e.g., 90 degrees in the present embodiment, although not limited thereto), such that the polarization direction of the image beam L1 is parallel to the polarization direction of the polarizer 102, thereby achieving 100% transmittance (e.g., the corresponding value corresponding to the operating period of the viewing glasses 100).

It should be noted that, besides the aforementioned embodiments being capable of automatically switching the viewing mode of the viewing glasses 100 to a viewing mode suitable for 3D display devices with different polarization directions, the embodiments may further perform automatic compensation on the polarization direction of the image beam L1 when the user of the viewing glasses 100 has a crooked viewing posture. For example, when the head of the viewer is slanted, the transmittance of the image beam L1 may still be continually adjusted to the corresponding value corresponding to the operating period of the viewing glasses 100, so as to prevent a darkening phenomenon on the stereoscopic image.

Moreover, in the Step S602 of FIG. 6, when the transmittance of the image beam L1 is not equal to the corresponding value corresponding to the operating period of the viewing glasses 100, then the Step S302 and the subsequent steps depicted in the embodiments of FIGS. 3-4 may be executed, so as to adjust the polarization axis direction of the image beam L1 such that the transmittance of the image beam L1 can be maintained at the corresponding value corresponding to the operating period of the viewing glasses 100.

In other embodiments of the invention, the storage unit 112 further stores, for example, a plurality of adjustment angles and a plurality of adjustment voltages corresponding to the adjustment angles as shown in Table 1 below. The adjustment angles are included angles between the polarization direction of the image beam L1 corresponding to the transmittance of the image beam L1 and the polarization axis direction of the polarizer 102. In other words, the adjustment angles are the angles of rotation for the polarization direction of the image beam L1, and each of the adjustment angles corresponds to two adjustment voltages of different values for adjustments in the clockwise direction and the counter-clockwise direction. Table 1 includes four transmittances out of the possible 1-99% transmittances as an illustrative example.

TABLE 1

| Transmittance of the Image Beam | Adjustment Angle | Adjustment Voltage |
|---|---|---|
| 2% | Clockwise (CW) 88° | 18 V |
|  | Counter-Clockwise (CCW) 88° | 11 V |
| 50% | CW 45° | 20 V |
|  | CCW 45° | 6 V |
| 75% | CW 30° | 22 V |
|  | CCW 30° | 4 V |
| 99% | CW 1° | 23 V |
|  | CCW 1° | 1 V |

Figure 9:
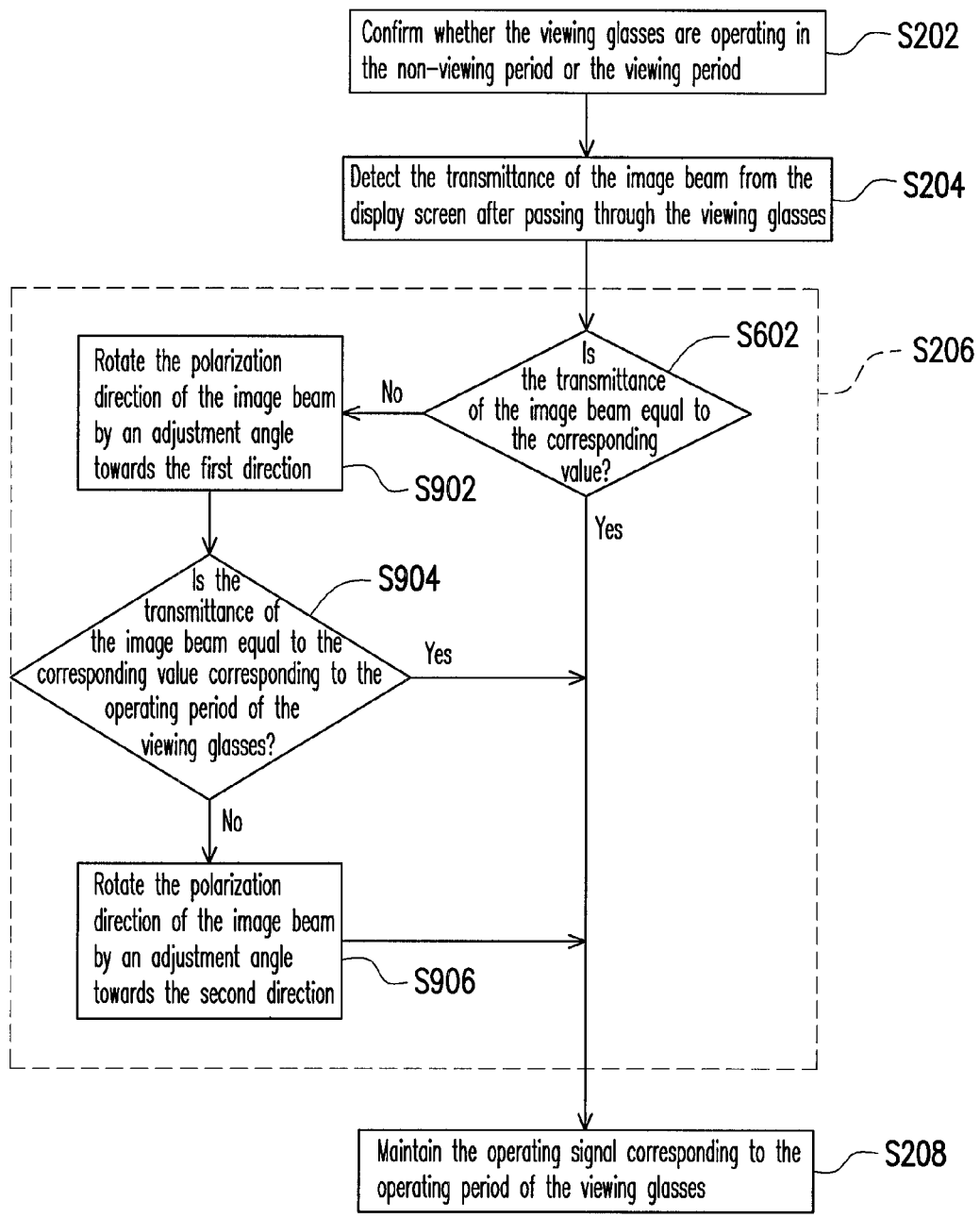
FIG. 9 is schematic view of an image beam adjustment of a pair of viewing glasses according to another embodiment of the invention.

FIG. 9 is a flow chart illustrating the steps of an image beam adjustment method of a pair of viewing glasses according to another embodiment of the invention. The image beam adjustment method of the present embodiment may employ the adjustment angles and the corresponding adjustment voltages shown in Table 1 to adjust the polarization direction of the image beam L1. A difference between the present embodiment and the embodiment depicted in FIG. 6 is that, when the control unit 110 determines the transmittance of the image beam L1 is not equal to the corresponding value corresponding to the operating period of the viewing glasses 100, the control unit 110 selects a corresponding adjustment angle according to the transmittance of the image beam L1, and selects one of the two adjustment voltages corresponding to the adjustment angle as the operating signal. Thereby, the polarization conversion unit 104 is controlled to rotate the polarization direction of the image beam L1 by an adjustment angle towards a first direction or a second direction. For example, in the present embodiment, the polarization direction of the image beam L1 is first rotated an adjustment angle towards the first direction (Step S902), then the control unit 110 determines again whether the transmittance of the image beam L1 after the adjustment angle rotation towards the first direction has reached the corresponding value corresponding to the operating period of the viewing glasses 100 (Step S904). If affirmative, then the control unit 110 maintains the current operating signal during the current period (Step S208). If the transmittance of the image beam L1 has not reached the corresponding value, then this represents the first direction adjustment is incorrect. Accordingly, the control unit 110 selects another adjustment voltage corresponding to the same adjustment angle as the operating signal, so as to rotate the polarization direction of the image beam L1 by a same adjustment angle towards the second direction (Step S906) such that the transmittance of the image beam L1 reaches the corresponding value corresponding to the operating period of the viewing glasses 100. Thereafter, the operating signal corresponding to the corresponding value is maintained during the operating period of the viewing glasses 100 (Step S208).

Figure 10:
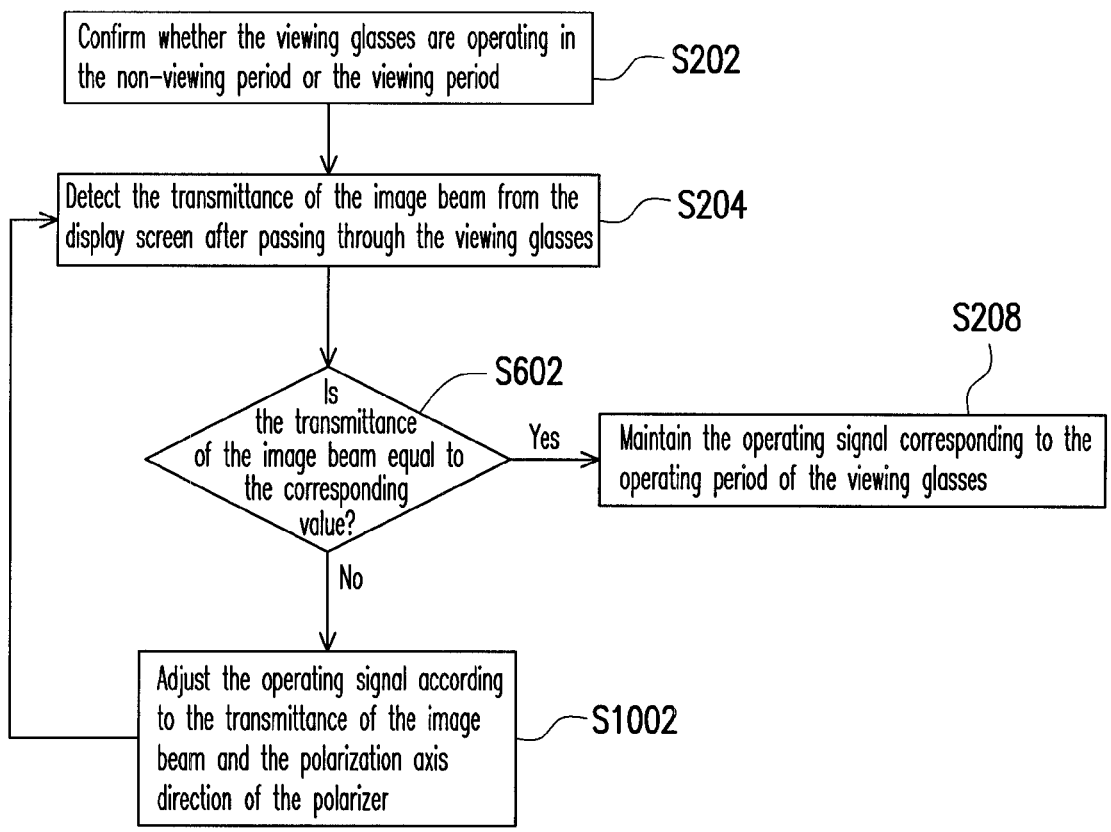
FIG. 10 is a flow chart illustrating the steps of an image beam adjustment method of a pair of viewing glasses according to another embodiment of the invention.

FIG. 10 is a flow chart illustrating the steps of an image beam adjustment method of a pair of viewing glasses according to another embodiment of the invention. Since different transmittances are generated with the polarizer 102 of different polarization axis directions and the corresponding image beam L1 of different preset polarization directions, therefore, in the present embodiment, the storage unit 112 further stores the preset voltages as shown in Table 2. The preset voltages correspond to the polarizer 102 of different polarization axis directions under different transmittances, and the corresponding image beam L1 of different preset polarization directions. In each of the combinations of polarizers of different polarization axis directions and transmittances, a detection process may be employed in practice to obtain a rotation angle of the polarization direction of the image beam L1 in each combination, such that the transmittance reaches the correct corresponding value. From the rotation angle, the operating voltages (e.g., operating signal) to provide to the polarization conversion unit 104 may be obtained, and these operating voltages the preset voltages in Table 2.

TABLE 2

| Polarizers of Different Polarization Axis Directions | Preset Voltages (0% Transmittance) | Preset Voltages (50% Transmittance) | Preset Voltages (100% Transmittance) |
| --- | --- | --- | --- |
| 0° | 2.8 V | 2.3 V or 3.1 V | 0 V |
| 45° | 2.3 V | 2.8 V or 2 V | 0 V |
| 90° | 2 V | 2.3 V or 3.1 V | 0 V |
| 135° | 3.1 V | 2.8 V or 2 V | 0 V |

Referring to FIG. 10, a difference between the present embodiment and the embodiment depicted in FIG. 6 is that, when the control unit 110 determines the transmittance of the image beam L1 is not equal to the corresponding value corresponding to the operating period of the viewing glasses 100, the control unit 110 adjusts the operating signal to a corresponding first preset voltage according to the transmittance of the image beam L1 and the polarization axis direction of the polarizer 102 (Step S1002). Thereafter, the process returns to the Step S204 to detect whether the transmittance of the image beam L1 has reached the corresponding value corresponding to the operating period of the viewing glasses 100. If affirmative, then the control unit 110 maintains the current operating signal during the current period (Step S208). If the transmittance of the image beam L1 has not reached the corresponding value, then the Steps S204, S5602, and S1002 are repeated. In the Step S1002, the operating signal is adjusted to the next corresponding preset voltage, until the polarization direction of the image beam L1 is adjusted to the direction corresponding to the corresponding value of the operating period of the viewing glasses 100. Thereafter, the operating signal corresponding to the corresponding value is maintained during the operating period of the viewing glasses 100 (Step S208).

For example, in the present embodiment assume the operating period of the viewing glasses 100 is the viewing period, and only four angles (e.g., 0, 45, 90, and 135 degrees) are possible for the polarization axis directions of the polarizer 102 and the polarization directions of the image beam L1. Therefore, under 0% and 100% transmittances, the polarizer 102 of each of the polarization axis directions respectively corresponds to the image beam L1 of only one polarization direction. On the other hand, under 50% transmittance, the polarizer 102 of each of the polarization axis directions respectively corresponds to the image beam L1 of two polarization directions. Accordingly, under 0% and 100% transmittances, the polarizer 102 of each of the polarization axis directions respectively corresponds to a preset voltage. On the other hand, under 50% transmittance, the polarizer 102 of each of the polarization axis directions respectively corresponds to two different preset voltages.

When the polarization axis direction of the polarizer 102 in the viewing glasses 100 is 0 degree and the transmittance is 0%, the polarization direction of the image beam L1 is fixed at 90 degrees. Therefore, by setting the operating voltage on the polarization conversion unit 104 to a corresponding 2.8V, the transmittance of the image beam L1 can reach the corresponding value corresponding to the viewing period. On the other hand, when the transmittance is 50%, the polarization direction of the image beam L1 may be 45 or 135 degrees. Therefore, when applying one of the two corresponding preset voltages results in the transmittance of the image beam L1 not reaching the corresponding value corresponding to the viewing period, the other corresponding preset voltage can be applied on the polarization conversion unit 104 so that the transmittance of the image beam L1 can reach the corresponding value corresponding to the viewing period. Similarly, when the operating period of the viewing glasses 100 is the non-viewing period, a similar adjustment method may be employed to adjust the transmittance of the image beam L1 to the corresponding value, so further description thereof is omitted hereafter.

Figure 11:
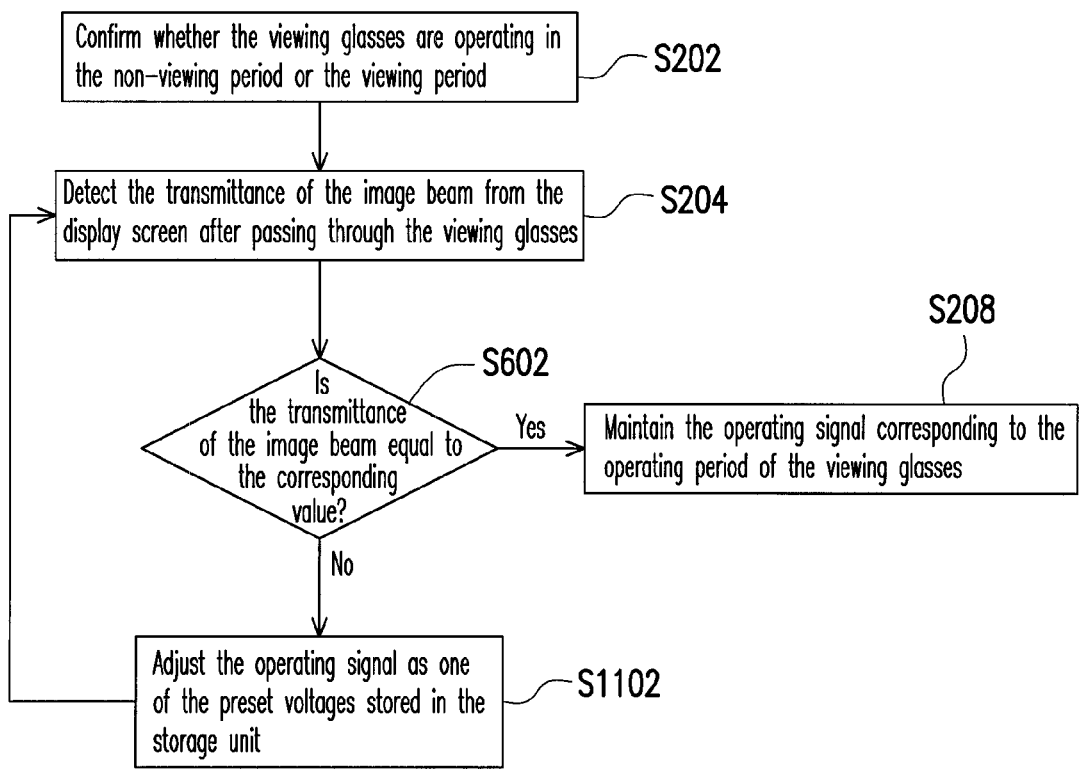
FIG. 11 is a flow chart illustrating the steps of an image beam adjustment method of a pair of viewing glasses according to another embodiment of the invention.

FIG. 11 is a flow chart illustrating the steps of an image beam adjustment method of a pair of viewing glasses according to another embodiment of the invention. In the present embodiment, the storage unit 112 further stores a plurality of preset voltages corresponding to a plurality of preset polarization directions. The preset polarization directions and voltages may, for example, be the preset polarization directions and voltages shown in the embodiment of FIG. 10. The present embodiment stores in the storage unit 112 the preset polarization directions of each type of 3D display devices on the market, as well as the correct corresponding operating voltages. A difference between the present embodiment and the embodiment depicted in FIG. 6 is that, when the control unit 110 determines the transmittance of the image beam L1 is not equal to the corresponding value corresponding to the operating period of the viewing glasses 100, the control unit 110 sequentially adjusts the operating signal to one of the plurality of preset voltages stored in the storage unit 112. Thereby, the polarization conversion unit 104 is controlled to rotate the polarization direction of the image beam L1 to the corresponding preset polarization direction (Step S1102). Thereafter, the process returns to the Step S204 to detect whether the transmittance of the image beam L1 has reached the corresponding value corresponding to the operating period of the viewing glasses 100. Accordingly, the Steps S204, S602, and S1102 are repeated using each of the preset voltages stored in the storage unit 112, until the polarization direction of the image beam L1 is adjusted to the direction corresponding to the corresponding value of the operating period of the viewing glasses 100.

Figure 12:
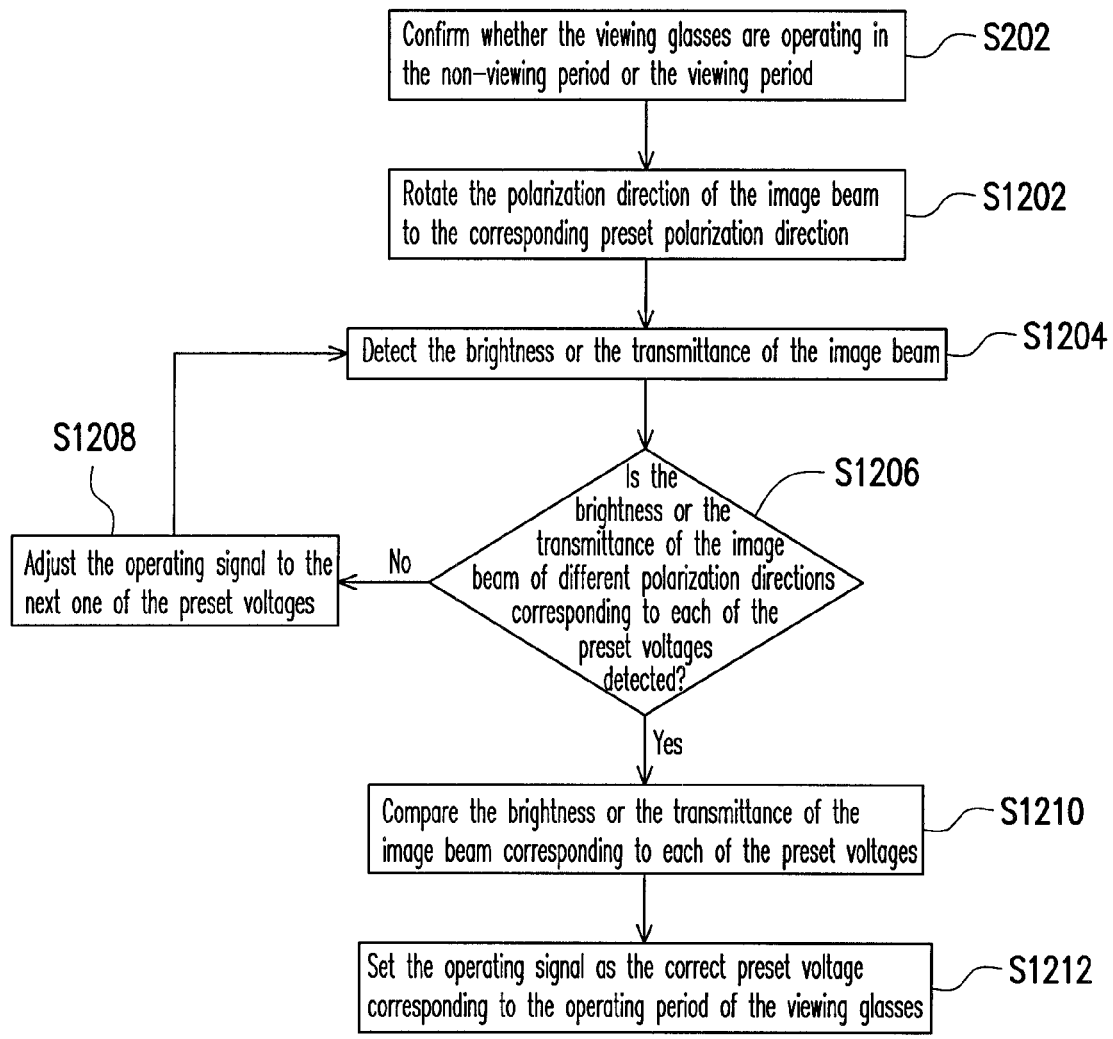
FIG. 12 is a flow chart illustrating the steps of an image beam adjustment method of a pair of viewing glasses according to another embodiment of the invention.

FIG. 12 is a flow chart illustrating the steps of an image beam adjustment method of a pair of viewing glasses according to another embodiment of the invention. A difference between the present embodiment and the embodiment depicted in FIG. 11 is that, after the Step S202, the control unit 110 adjusts the operating signal to one of the preset voltages, so as to rotate the polarization direction of the image beam L1 to the corresponding preset polarization direction (Step S1202). Thereafter, the light sensing unit 108 detects the brightness or the transmittance of the image beam L1 (Step S1204). Next, the control unit 110 determines whether the brightness or the transmittance of the image beam L1 of different polarization directions corresponding to each of the preset voltages has been detected (Step S1206). When the detection process is not yet complete, the control unit 110 adjusts the operating signal to the next one of the aforementioned preset voltages (Step S1208), and the process is returned to the Step S1204 to detect the brightness or the transmittance of the image beam L1.

Conversely, when the detection process of the brightness or the transmittance of the image beam L1 of different polarization directions is complete, then the control unit 110 compares the brightness or the transmittance of the image beam L1 corresponding to each of the preset voltages (Step S1210), so as to set the operating signal as the correct preset voltage corresponding to the operating period of the viewing glasses 100 (Step S1212). For example, when the viewing glasses 100 is operating in the non-viewing period, the operating signal is set as the preset voltage corresponding to the lowest of the brightness or the transmittance of the image beam L1. On the other hand, when the viewing glasses 100 is operating in the viewing period, the operating signal is set as the preset voltage corresponding to the highest of the brightness or the transmittance of the image beam L1. Accordingly, even when the corresponding value of the operating period of the viewing glasses 100 is not used, a correct adjustment can be performed.

Figure 13:
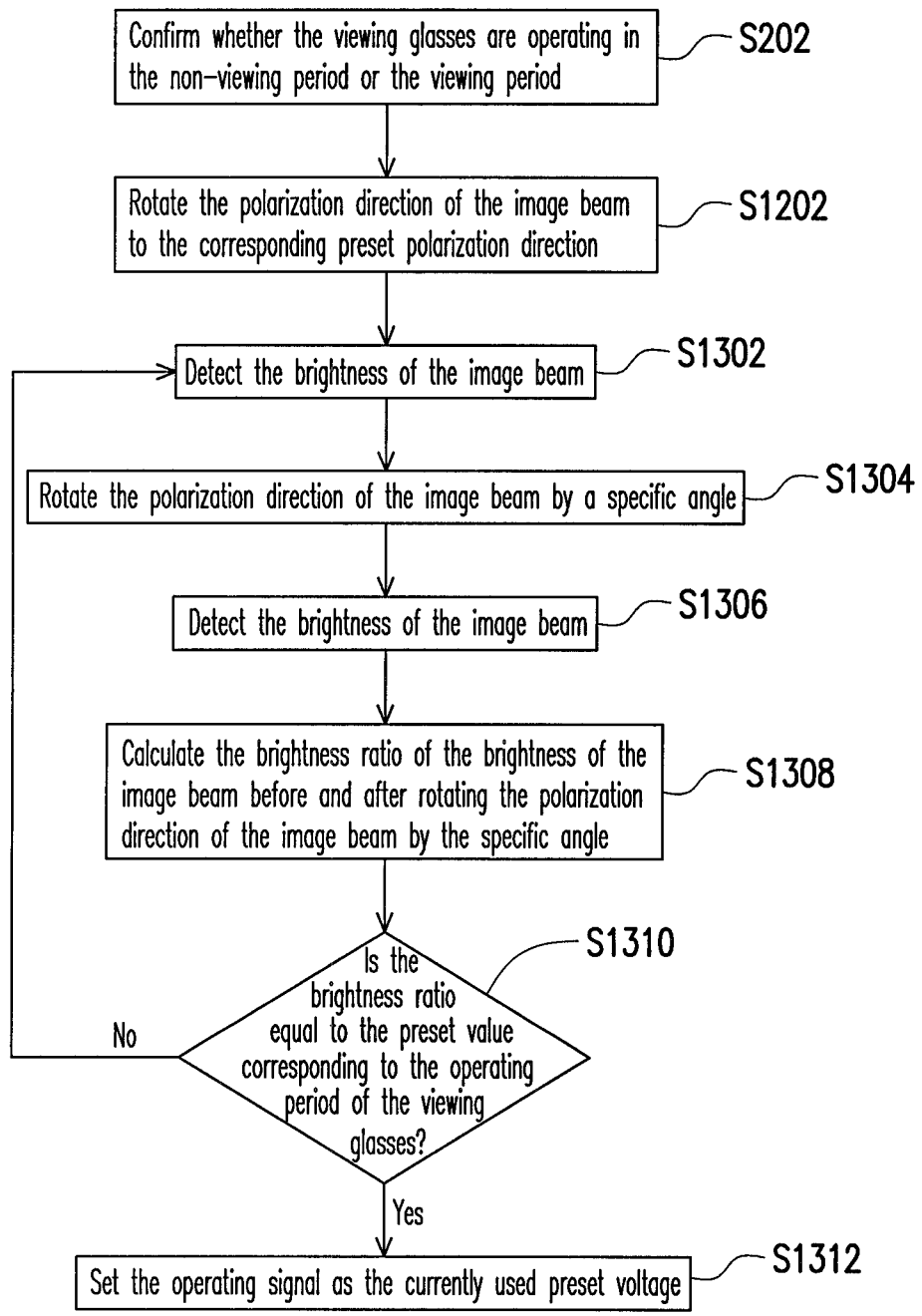
FIG. 13 is a flow chart illustrating the steps of an image beam adjustment method of a pair of viewing glasses according to another embodiment of the invention.

FIG. 13 is a flow chart illustrating the steps of an image beam adjustment method of a pair of viewing glasses according to another embodiment of the invention. Referring to FIG. 13, a difference between the present embodiment and the embodiment depicted in FIG. 12 is that, after the Step S1202, the light sensing unit 108 detects the brightness of the image beam L1 (Step S1302). Thereafter, the control unit 110 adjusts the operating signal to rotate the polarization direction of the image beam L1 by a specific angle (Step S1304), and then the light sensing unit 108 detects the brightness of the image beam L1 (Step S1306). Thereafter, the control unit 110 calculates the brightness ratio of the brightness of the image beam L1 before and after rotating the polarization direction of the image beam by the specific angle (Step S1308). Moreover, the calculated brightness ratio is compared with a first preset value or a second preset value according to the operating period of the viewing glasses 100, so as to determine whether the brightness ratio is equal to the preset value corresponding to the operating period of the viewing glasses 100 (Step S1310). In the present embodiment, the specific angle is 90 degrees, although the invention is not limited thereto. Moreover, the first preset value is the brightness ratio of the ideal brightness of the image beam L1 in the non-viewing period to the ideal brightness of the image beam L1 in the viewing period, whereas the second preset value is the brightness ratio of the ideal brightness of the image beam L1 in the viewing period to the ideal brightness of the image beam L1 in the non-viewing period. In other words, when the viewing glasses 100 is operating in the non-viewing period, the control unit 110 compares the brightness ratio with the first preset value. Moreover, when the viewing glasses 100 is operating in the viewing period, the control unit 110 compares the brightness ratio with the second preset value.

When the viewing glasses 100 is operating in the non-viewing period and the brightness ratio is equal to the first preset value, or when the viewing glasses 100 is operating in the viewing period and the brightness ratio is equal to the second preset value, the control unit 110 sets the operating signal as the currently used preset voltage (Step S1312). When the brightness ratio is not equal to the preset value corresponding to the operating period of the viewing glasses 100, the control unit 110 adjusts the operating signal to the next one of the aforementioned preset voltages, and the process is returned to the Step S1302 to detect the brightness of the image beam L1. The Steps S1302-S1310 are repeated until the calculated brightness ratio is equal to the preset value corresponding to the operating period of the viewing glasses 100. In other words, the polarization direction of the image beam L1 is adjusted to the correct direction corresponding to the operating period of the viewing glasses 100.

Figure 14:
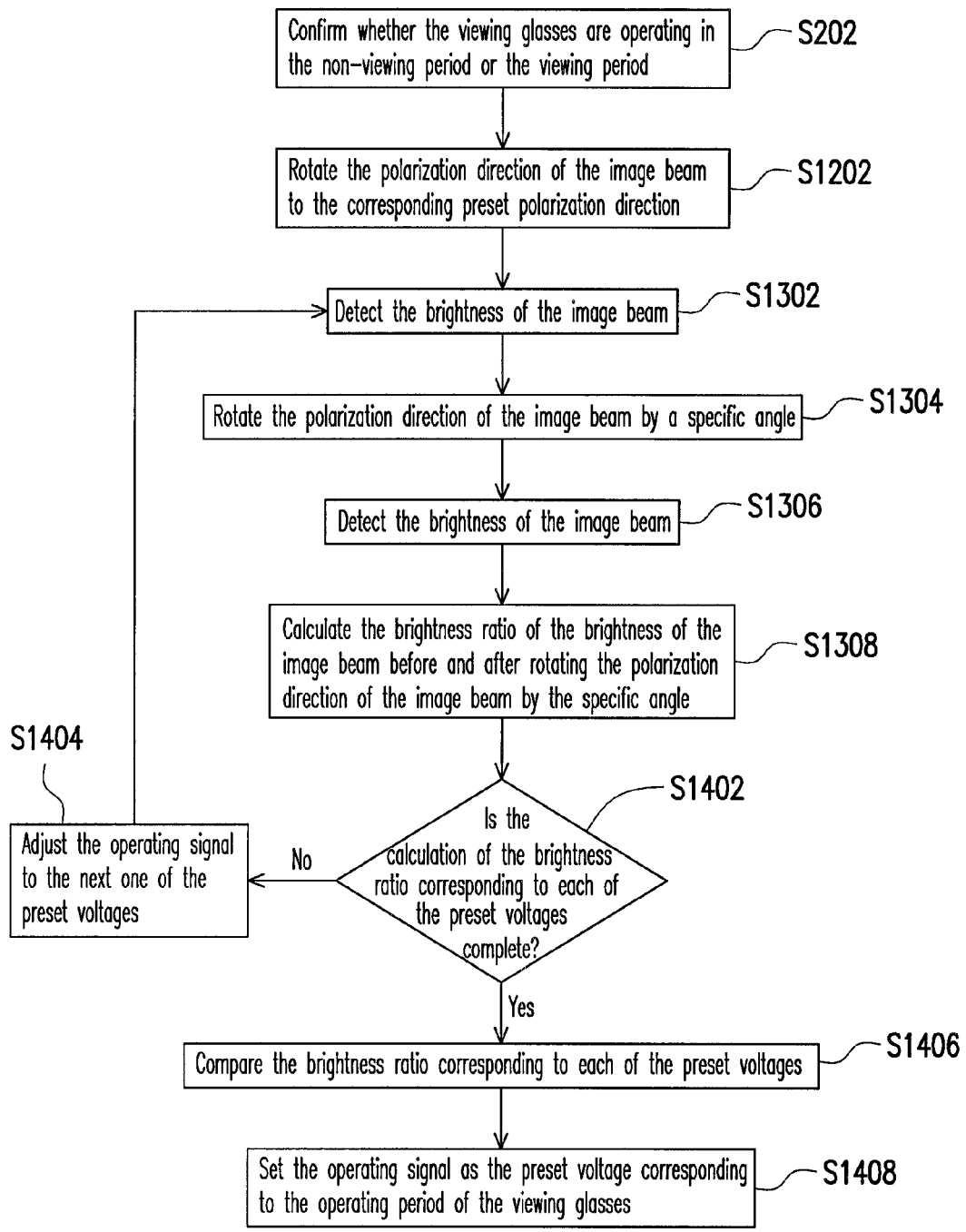
FIG. 14 is a flow chart illustrating the steps of an image beam adjustment method of a pair of viewing glasses according to another embodiment of the invention.

FIG. 14 is a flow chart illustrating the steps of an image beam adjustment method of a pair of viewing glasses according to another embodiment of the invention. Referring to FIG. 14, a different between the present embodiment and the embodiment depicted in FIG. 13 is that, after the Step S1308, the control unit 110 determines whether the calculation of the brightness ratio corresponding to each of the preset voltages is complete (Step S1402). When the calculation is not complete, then the operating signal is adjusted to the next one of the aforementioned preset voltages (Step S1404), and the process is returned to Step S1302 to detect the brightness of the image beam L1. When the brightness ratio for each of the preset voltages is complete, then the control unit 110 compares the brightness ratios corresponding to each of the preset voltages (Step S1406). According to the brightness ratio corresponding to each of the preset voltages, the operating signal is set as the preset voltage corresponding to the operating period of the viewing glasses 100 (Step S1408). For example, when the viewing glasses 100 is operating in the non-viewing period, the operating signal is set as the preset voltage corresponding to the smallest of the aforementioned brightness ratios. On the other hand, when the viewing glasses 100 is operating in the viewing period, the operating signal is set as the preset voltage corresponding to the largest of the aforementioned brightness ratios. In other words, the polarization direction of the image beam L1 is adjusted to the correct direction corresponding to the operating period of the viewing glasses 100.

It should be noted that, since the viewing glasses 100 employs a single light sensing unit 108 to find the transmittance of the image beam L1, therefore a preset adjustment image needs to complement an automatic adjustment of the polarization direction of the image beam L1. Accordingly, before viewing a main image, first the preset adjustment image is played back. The corresponding relationship between various levels of the light intensity and various transmittances stored in the storage unit 112 is established using the preset adjustment image. Thereby, the control unit 110 can use the detected light intensity from the light sensing unit 108 and the corresponding relationship stored in the storage unit 112 to obtain an accurate transmittance. After waiting for the viewing glasses 100 to adjust the polarization direction of the image beam L1, the main image is played back for viewing.

Figure 15:
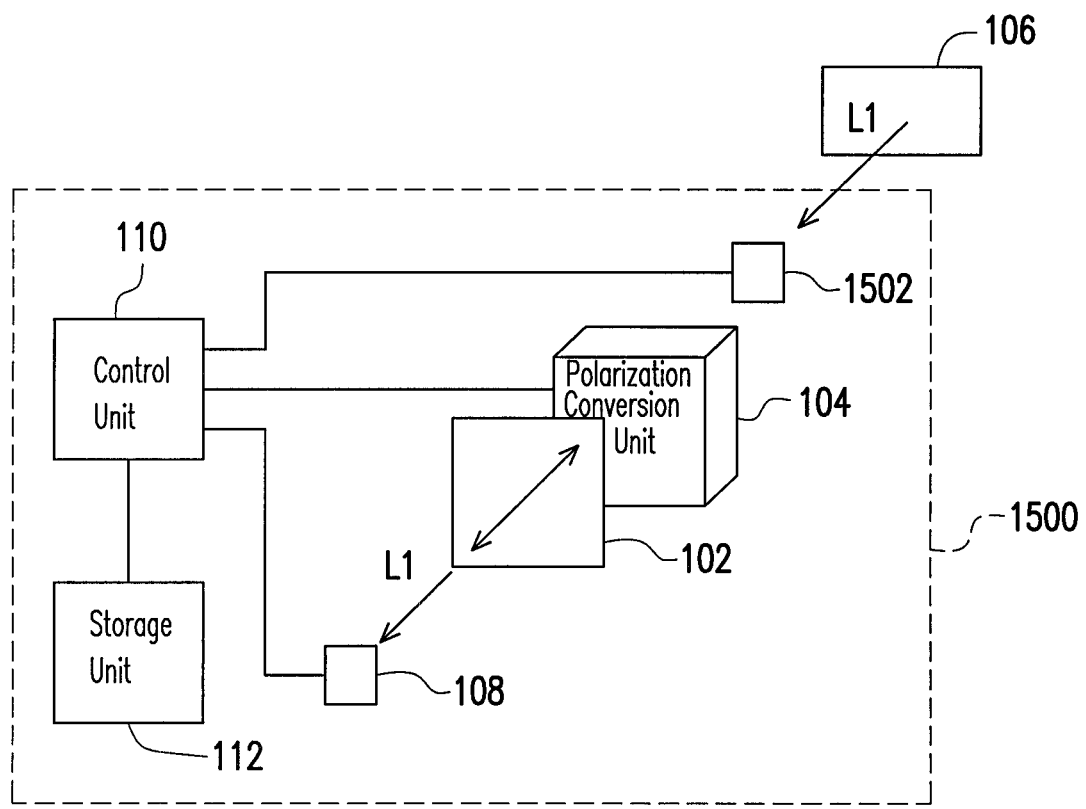
FIG. 15 is a schematic view of a pair of viewing glasses of a 3D display device according to another embodiment of the invention.

FIG. 15 is a schematic view of a pair of viewing glasses of a 3D display device according to another embodiment of the invention. Referring to FIG. 15, a difference between a pair of viewing glasses 1500 of the present embodiment and the viewing glasses 100 depicted in the embodiment of FIG. 1 is that, the viewing glasses 1500 includes another light sensing unit 1502 coupled to the control unit 110. The light sensing unit 1502 is used to detect a second light intensity of the image beam L1 before passing through the polarization conversion unit 104 and the polarizer 102. The control unit 110 may obtain the transmittance of the image beam L1 by calculating the ratio of the first light intensity detected by the light sensing unit 108 to the second light intensity detected by the light sensing unit 1502. Accordingly, the viewing glasses 1500 may directly use the main image for viewing to adjust the polarization direction of the image beam L1, and thus playback of the preset adjustment image is unnecessary. In the image beam adjustment method of the viewing glasses 1500 according to the present embodiment, besides the difference in obtaining the transmittance, the rest of the steps are similar to the embodiments depicted in FIGS. 2-14, and therefore further description thereof is omitted hereafter.

Figure 16:
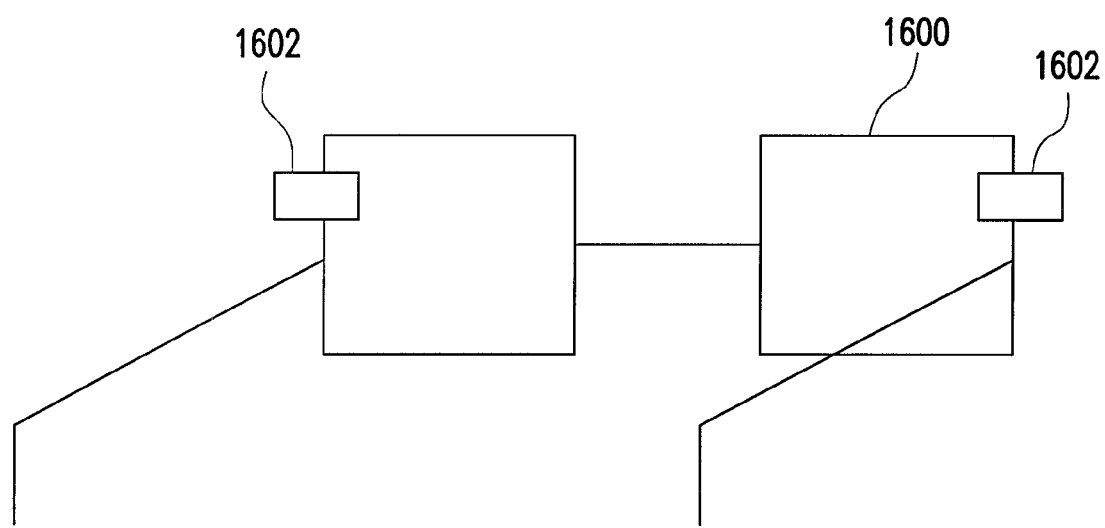
FIG. 16 is a schematic view of a pair of viewing glasses of a 3D display device according to another embodiment of the invention.

FIG. 16 is a schematic view of a pair of viewing glasses of a 3D display device according to another embodiment of the invention. Referring to FIG. 16, a pair of viewing glasses 1600 of the present embodiment has a light sensing unit 1602 disposed behind the lenses of the viewing glasses 1600. A portion of the light sensing unit 1602 is located within a range of the lenses of the viewing glasses 1600. The rest of the light sensing unit 1602 stands out of the range of the viewing glasses 1600, so the light sensing unit 1602 can simultaneously detect the first light intensity of the image beam L1 after passing through the polarization conversion unit 104 and the polarizer 102, and the second light intensity of the image beam L1 before passing through the polarization conversion unit 104 and the polarizer 102. Accordingly, only a single light sensing unit 1602 is required to use the control unit 110 to obtain the transmittance of the image beam L1 by calculating the ratio of the first and second light intensities, as shown in the embodiment depicted in FIG. 15.

In view of the foregoing, an embodiment of the invention adjusts the polarization direction of the image beam according to the transmittance detected from the image beam and the corresponding value corresponding to the viewing or non-viewing period of the viewing glasses. Thereby, the viewing glasses can be suitably used for 3D display devices having different polarization directions. Accordingly, the manufacturer saves a production cost and the user no longer has to make wasteful purchases of multiple viewing glasses. Moreover, a darkening phenomenon on the stereoscopic image due to the different viewing postures of the user is prevented.

The above-described embodiments may also correct a condition when a switch timing of the viewing glasses during the non-viewing and viewing periods are not in sync with a switch timing of the images displayed by the display screen. For example, when the left eye lens of the viewing glasses should receive the left eye image, the left eye lens instead operates in the non-viewing period, or when the right eye lens of the viewing glasses should receive the right eye image, the right eye lens instead operates in the non-viewing period. The foregoing condition of the incorrect timing for the viewing and non-viewing periods of the left and right eyes may be corrected by the above-described embodiments. In addition, by using two light sensing units to detect the transmittance of the image beam, the main image for viewing may be directly used to adjust the polarization direction of the image beam at any time, and therefore the playback of an additional preset adjustment image before the main image is unnecessary.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pair of viewing glasses, comprising:
   a polarizer;
   a polarization conversion unit, disposed between a display screen and the polarizer, controlled by an operating signal to adjust a polarization direction of an image beam from the display screen before passing through the polarizer;
   a first light sensing unit detecting a first light intensity of the image beam after passing through the polarization conversion unit and the polarizer; and
   a control unit coupled to the first light sensing unit and the polarization conversion unit, the control unit obtaining brightness or transmittance of the image beam according to the first light intensity, and generating an operating signal according to an operating period of the viewing glasses, a corresponding value corresponding to the operating period of the viewing glasses, and the brightness or the transmittance of the image beam, so the transmittance is equal to the corresponding value corresponding to the operating period of the viewing glasses, and maintaining the operating signal during the operating period of the viewing glasses, wherein the operating period of the viewing glasses is a non-viewing period or a viewing period, wherein the control unit further determines whether the transmittance of the image beam is the corresponding value, when the transmittance of the image beam is not the corresponding value, the control unit controls the polarization conversion unit to rotate the polarization direction of the image beam towards a first direction, and when the transmittance of the image beam is the corresponding value corresponding to the one of the non-viewing period and the viewing period other than the operating period of the viewing glasses, the control unit controls the polarization conversion unit to rotate the polarization direction of the image beam by a specific angle.

2. The viewing glasses as claimed in claim 1, wherein the first light sensing unit further detects a second light intensity of the image beam before passing through the polarization conversion unit and the polarizer, the control unit uses a ratio of the first light intensity to the second light intensity as the transmittance of the image beam.

3. The viewing glasses as claimed in claim 1, further comprising:
   a second light sensing unit, coupled to the control unit, detecting a second light intensity of the image beam before passing through the polarization conversion unit and the polarizer, wherein the control unit uses a ratio of the first light intensity to the second light intensity as the transmittance of the image beam.

4. A pair of viewing glasses, comprising:
   a polarizer;
   a polarization conversion unit, disposed between a display screen and the polarizer, controlled by an operating signal to adjust a polarization direction of an image beam from the display screen before passing through the polarizer;
   a first light sensing unit detecting a first light intensity of the image beam after passing through the polarization conversion unit and the polarizer;
   a second light sensing unit, detecting a second light intensity of the image beam before passing through the polarization conversion unit and the polarizer; and
   a control unit coupled to the first light sensing unit, the second light sensing unit and the polarization conversion unit, the control unit obtaining brightness or transmittance of the image beam according to the first light intensity, and generating an operating signal according to an operating period of the viewing glasses, a corresponding value corresponding to the operating period of the viewing glasses, and the brightness or the transmittance of the image beam, so the transmittance is equal to the corresponding value corresponding to the operating period of the viewing glasses, and maintaining the operating signal during the operating period of the viewing glasses, wherein the control unit uses a ratio of the first light intensity to the second light intensity as the transmittance of the image beam, wherein the operating period of the viewing glasses is a non-viewing period or a viewing period, wherein the control unit further controlling the polarization conversion unit to rotate the polarization direction of the image beam towards a first direction, and the control unit determines whether the transmittance of the image beam has passed the corresponding value of the viewing period or the non-viewing period, when the transmittance of the image beam has passed the corresponding value of the viewing period or the non-viewing period, the control unit controls polarization conversion unit to rotate the polarization direction of the image beam towards a second direction back to a polarization direction corresponding to the corresponding value of the viewing period or the non-viewing period, and when the corresponding value of the viewing period or the non-viewing period is not the corresponding value of the operating period of the viewing glasses, the control unit controls the polarization conversion unit to rotate the polarization direction of the image beam by a specific angle.

5. A pair of viewing glasses, comprising:
a polarizer;
a polarization conversion unit, disposed between a display screen and the polarizer, controlled by an operating signal to adjust a polarization direction of an image beam from the display screen before passing through the polarizer;
a first light sensing unit detecting a first light intensity of the image beam after passing through the polarization conversion unit and the polarizer;
a second light sensing unit, detecting a second light intensity of the image beam before passing through the polarization conversion unit and the polarizer; and
a control unit coupled to the first light sensing unit, the second light sensing unit and the polarization conversion unit, the control unit obtaining brightness or transmittance of the image beam according to the first light intensity, and generating an operating signal according to an operating period of the viewing glasses, a corresponding value corresponding to the operating period of the viewing glasses, and the brightness or the transmittance of the image beam, so the transmittance is equal to the corresponding value corresponding to the operating period of the viewing glasses, and maintaining the operating signal during the operating period of the viewing glasses, wherein the control unit uses a ratio of the first light intensity to the second light intensity as the transmittance of the image beam, wherein the operating period of the viewing glasses is a non-viewing period or a viewing period, wherein the control unit further controlling the polarization conversion unit to rotate the polarization direction of the image beam towards a first direction, and the control unit determines whether the transmittance of the image beam approaches the corresponding value, when the transmittance of the image beam approaches the corresponding value, the control unit controls the polarization conversion unit to rotate the polarization direction of the image beam towards a first direction to a direction corresponding to the corresponding value, and when the transmittance of the image beam deviates from the corresponding value, the control unit controls the polarization conversion unit to rotate the polarization direction of the image beam towards a second direction to the direction corresponding to the corresponding value.

* * * * *